United States Patent
Ogawa

(10) Patent No.: US 6,776,937 B2
(45) Date of Patent: Aug. 17, 2004

(54) METHOD OF CORRECTING RADIAL FORCE VARIATION OF TIRE AND APPARATUS THEREFOR

(75) Inventor: Yuichiro Ogawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 363 days.

(21) Appl. No.: 09/918,449

(22) Filed: Aug. 1, 2001

(65) Prior Publication Data

US 2002/0014301 A1 Feb. 7, 2002

(30) Foreign Application Priority Data

Aug. 1, 2000 (JP) .................................... 2000-232980
Jun. 19, 2001 (JP) .................................... 2001-184473

(51) Int. Cl.[7] .............................................. B29D 30/00
(52) U.S. Cl. ...................... 264/40.1; 73/146; 264/322; 264/345
(58) Field of Search ............................. 204/40.1, 319, 204/326, 345, 348; 264/320, 322, 345; 73/146

(56) References Cited

U.S. PATENT DOCUMENTS 3,529,048 A * 9/1970 Kovac et al. ............... 264/502
3,872,208 A * 3/1975 Brown et al. ............... 264/346
5,365,859 A * 11/1994 Schrage ...................... 108/56.1
5,616,859 A    4/1997 Rhyne

FOREIGN PATENT DOCUMENTS

| EP | 0 587 853 B1 | 3/1994 |
| EP | 0 978 370 A2 | 2/2000 |
| EP | 1 023 987 A2 | 8/2000 |
| GB | 1 388 047 A  | 3/1975 |

* cited by examiner

Primary Examiner—Mathieu D. Vargot
(74) Attorney, Agent, or Firm—Sughrue Mion, PLLC

(57) ABSTRACT

A radial force variation of a tire is corrected irrespectively of the kind of the organic fiber cord used, wherein a radial force variation (RFV) is measured at room temperature to specify a tire position indicating a minimum value of RFV, and an inner face of a tread portion is pushed and enlarged outward in a radial direction of the tire by a pushing means at a RFV bottom region sandwiching the position of the minimum RFV value from both sides thereof in a circumferential direction of the tread portion, and such a push enlarged state is kept for a given time.

5 Claims, 6 Drawing Sheets

METHOD OF CORRECTING RADIAL FORCE VARIATION OF TIRE AND APPARATUS THEREFOR

BACKGROUND OF THE INVENTION

1. Field of the Invention

This invention relates to a method of correcting a radial force variation (hereinafter abbreviated as RFV) of a tire and an apparatus therefor, which can effectively and advantageously improve RFV among uniformity characteristics of a pneumatic radial tire using an organic fiber cord as a carcass ply cord, particularly a small-size tire typified by a radial tire for a passenger car.

2. Description of Related Art

It is well-known that the uniformity of the tire, particularly the radial tire is an important property controlling the good or bad tire performances. Among the uniformity characteristics, RFV affects the performances of almost all radial tires and particularly has a remarkable influence upon steering stability and ride comfort against vibrations of the radial tire for passenger car, uneven wear of the tread portion and the like. Therefore, an acceptable upper limit of RFV is defined every kind of tire.

The measurement and characteristics of RFV will simply be described below.

When the tire attached to a uniformity testing machine is added with a load and rotated at a state of fixing a loading radius, reaction force during the one revolution of the tire always varies large or small, and a full amplitude of such a varying quantity is called as RFV. When the reaction force of the tire is plotted on an ordinate and a rotating distance in the one revolution of the tire is plotted on an abscissa, the variation of the reaction force measured by the testing machine can be taken out as a waveform wherein a primary component is generally an approximately sine wave form and secondary or more components are superimposed thereon. An example of the primary component wave form in RFV is shown by a solid line in FIG. 5.

The RFV of the tire mounted onto a vehicle is a varying quantity of a reaction force produced from a road surface in a radial direction per one revolution of the tire during the running under loading. The variation of the reaction force is a force applied to the vehicle, so that the tire having a large RFV value brings about disadvantages that the ride comfort against vibration in the vehicle is degraded and uneven wear is sometimes generated in the tread portion and particularly the steering stability of the vehicle during the running at a high speed is considerably damaged, and the like.

For this end, it is required to restrict the RFV of the tire to a range not causing these disadvantages. In the tires attaching importance to the uniformity characteristics, particularly radial tires for passenger car, therefore, each of all tire products after the vulcanization is mounted onto a given rim and inflated under a given internal pressure and subjected to an inspection sorting acceptance or rejection of uniformity, during which tires exceeding a given RFV value are removed off from a forwarding line as a reject product.

And also, the uniformity of the tire includes vertical vibration and lateral vibration based on the change of the size in addition to the aforementioned force variation. Among these vibrations, the vertical vibration in the radial direction of the tire particularly affects the tire performances. An absolute value of the vertical vibration in the radial direction is called as radial runout (hereinafter abbreviated as RR). In general, the RR is said to have a close relation to the RFV.

Therefore, the RR and RFV are simultaneously measured in the inspection sorting the acceptance or rejection of the uniformity. The tires rejected by the RFV are marked at a position showing a maximum RR value and removed off from the inspection line and subjected to correction of RFV. In this correcting method, the RFV-rejected tire is mounted onto a given rim and inflated under a given internal pressure, and thereafter a surface of a tread rubber marked is subjected to buffing through a grinder to cut off only a part of the tread rubber by a gauge in accordance with the RFV value, whereby the value of RFV is reduced.

And also, the RR waveform and the RFV waveform do not necessarily correspond to each other at both peak positions. There is also a method wherein the RFV correction through the above buffing is directly carried out to a part of the tread portion centering a position indicating a maximum RFV value in a primary component taken out from the RFV waveform along a circumference thereof.

However, even if the reject tires can be saved by these methods of correcting the RFV value to an adequate range through the buffing, it is substantially impossible to completely restore the appearance of the tread portion subjected to the buffing and hence the lowering of the tire appearance value is undeniable. Furthermore, there can not be overlooked a problem that rubber dust generated by buffing the tread rubber damages the working environment.

For this end, it is attempted to take shaping factor and curing factor among factors of the RFV and minimize the RFV value, i.e. offset these shaping factor and curing factor to each other to raise a value of minimum value A and lower a value of a maximum value B in RFV shown by a primary component waveform of RFV in FIG. 5 and hence reduce the value of RFV. However, such an attempt is critical in the correcting quantity and is insufficient in the improvement of RFV.

In this connection, U.S. Pat. No. 5,616,859 proposes that RR is adopted as a target for correcting the uniformity and a part of cords in at least one ply existing in a sidewall portion is subjected to permanent deformation so as to make the RR below an acceptable value. Such a permanent deformation is carried out by restraining a part of the tire located other than a position to be corrected under an inflation of the tire at a previously set pressure and restricting the stretching of the cord in such a restrained portion.

According to the method described in the above U.S. patent, the correction of RFV can be carried out without damaging the tire appearance if positions indicating the maximum value and the minimum value correspond to each other between RR and RFV. However, since a part of the carcass ply cord is permanently deformed, it is required to apply a considerably high tension to the carcass ply cord and also the internal pressure of the tire should be rendered into a considerably higher value, and hence there is a fear of breaking the tire during the formation of the permanent deformation in the cord.

In order to solve the problem of RFV correction disclosed in the above U.S. patent, the inventors have proposed a method wherein RFV itself is adopted instead of RR in the RFV-rejected tires and the maximum value of RFV is decreased and the minimum value of RFV is increased and as a result RFV is corrected without being subjected to a cutting work such as buffing or the like and inflating under a considerably high internal pressure in U.S. patent application Ser. No. 09/492,853.

According to this method, after RFV of a tire inflated under a given internal pressure is measured, a first distinguishing mark is put to a first tire portion indicating a minimum value of RFV and a second distinguishing mark is put to a second tire portion indicating a maximum value of RFV, and different thermal hysteresis are applied and a state of applying a given internal pressure to the tire is kept during the cooling in the thermal hysteresis. It has been confirmed that this method can develop an excellent effect.

In the RFV correction of the above US patent and US patent application, however, the correcting quantities of RR and RFV are confined to slight values, respectively, when a cord being small in the elongation and very small in the thermal shrinkage such as rayon cord or the like is used in the carcass ply of the tire. In this point, it is undeniable that the RFV correction is insufficient. On the other hand, when nylon cord or polyester cord being large in the thermal shrinkage is used in the tire, the RFV value tends to return to a value before the correction accompanied with the rise of the temperature under the occurrence of strain during the running of the tire under loading.

SUMMARY OF THE INVENTION

It is, therefore, an object of the invention to solve the problems in the RFV correction of the above US patent and further improve the RFV correction in the above US patent application and to provide a method of correcting RFV of a tire which does not follow a risk of tire breakage and is hardly influenced by the rise of temperature under the occurrence of strain during the running of the tire under loading irrespectively of the kind of organic fiber cord constituting the carcass ply as well as a RFV correction apparatus suitable for realizing the correction method.

According to a first aspect of the invention, there is the provision of a method of correcting RFV of a tire comprising a tread portion and a carcass ply of radial structure containing rubberized organic fiber cords therein, which comprises measuring RFV at room temperature to specify a tire position indicating a minimum value of RFV, pushing and enlarging an inner face of the tread portion outward in a radial direction of the tire by a pushing means at a RFV bottom region sandwiching the position of the minimum RFV value from both sides thereof in a circumferential direction of the tread portion, and keeping such a push enlarged state for a given time.

In a preferable embodiment of the first aspect, the RFV bottom region is heated from room temperature to a given temperature and thereafter the inner face of the tread portion at the RFV bottom region is pushed and enlarged by the pushing means outward in the radial direction and cooling of the tire is started together with such a push enlarging to keep the push enlarged state for a given time under cooling.

In another preferable embodiment of the first aspect, the measured RFV is subjected to a Fourier waveform analysis to take a primary component waveform of RFV and the position of RFV minimum value and the RFV bottom region are specified from the primary component waveform.

In the other preferable embodiment of the first aspect, the tire after the measurement of RFV is assembled onto a split rim and heated under an atmospheric pressure and a given internal pressure is filled in an inside of the tire after the completion of the heating and a pushing member as the pushing means fixed to either one segment of the split rim is displaced outward in the radial direction of the tire to push the inner face of the tread portion at the RFV bottom region.

In a still further preferable embodiment of the first aspect, a pushing force of the pushing member as a pushing means is maximum at the position of the RFV minimum value in the tire and is gradually decreased from this position toward both sides thereof in the circumferential direction.

According to a second aspect of the invention, there is the provision of an apparatus for correcting RFV of a tire comprising a tread portion and a carcass ply of a radial structure containing rubberized organic fiber cords therein, which comprises a split rim assembling the tire, a pushing means arranged on either one segment of the split rim, and a feed and discharge valve of a pressurized gas to an inside of the tire assembled onto the rim, in which a pushing member reciprocatively moving in a radial direction of the tire assembled onto the rim and pushing an inner face of the tread portion from an inside of the tire is arranged in the pushing means, and either one segment of the split rim is fixed to a main body of the apparatus and the other segment is connected to a moving means in an axial line direction of the rim displacing the rim between operation position and non-operation position in the assembling of the tire.

In a preferable embodiment of the second aspect, the rim segment fixed to the main body of the apparatus is enclosed with a single-plane opening container having a volume capable of housing the tire to be assembled onto the split rim, and a lid covering an opening face of the container as a whole is arranged on the rim segment connected to the moving means in the axial line direction of the rim, and feed means and discharge means of heating gas and cooling gas are arranged in the container.

In another preferable embodiment of the second aspect, the pushing means has a reciprocative moving means reciprocating the pushing member outward and inward in the radial direction of the tire, and the pushing member is provided on its outer surface with the same or approximate curve as the inner face of the tread portion.

In the other preferable embodiment of the second aspect, the reciprocative moving means is constructed with a pair of actuators extending in parallel to each other at a state of sandwiching the axial line of the rim provided with the pushing means.

In a still further preferable embodiment of the second aspect, the reciprocative moving means in the pushing means comprises an actuator fixed to a projection portion of the rim provided with the pushing means and a pivoting arm hinging its one end portion to a central portion of the pushing member in the circumferential direction, and the other end portion of the pivoting arm is pivotably connected to the projection portion of the rim, and a top portion of an operation shaft of the actuator is hinged to a middle portion of the pivoting arm.

In a yet further preferable embodiment of the second aspect, the split rim is horizontally arranged so as to separate in up and down directions, and an upper rim segment is fixed to the main body of the apparatus and a lower rim segment is provided with the pushing means and the reciprocative moving means in the axial line direction of the rim.

BRIEF DESCRIPTION OF THE DRAWINGS

The invention will be described with reference to the accompanying drawings, wherein.

DETAILED DESCRIPTION OF THE INVENTION

Figure 1:
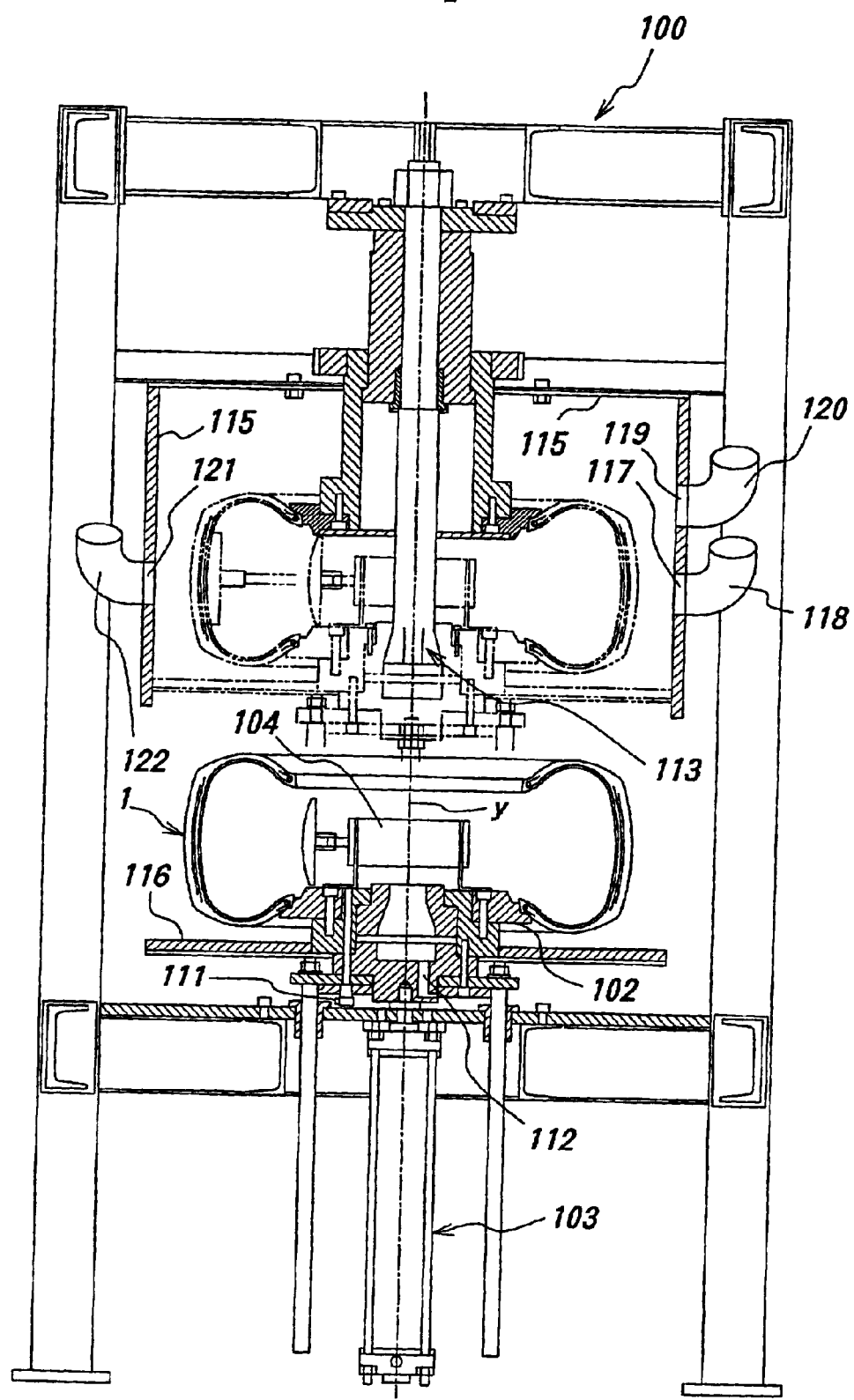
FIG. 1 is a diagrammatically section view of an embodiment of the RFV correction apparatus according to the invention and a tire amounted thereonto.
Figure 2:
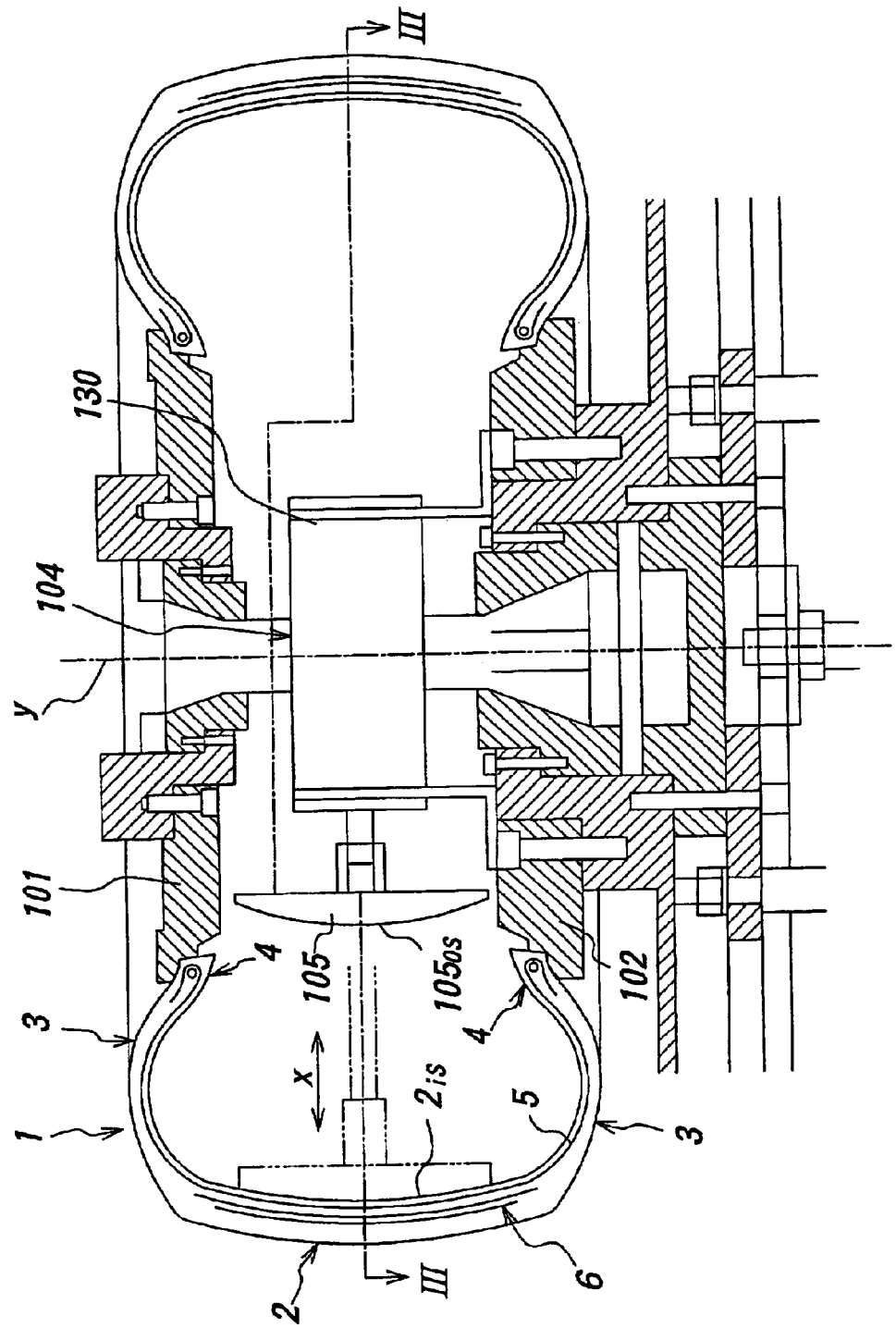
FIG. 2 is a diagrammatically enlarged section view illustrating a main part of the apparatus and the tire shown in FIG. 1.

A tire 1 shown in FIGS. 1 and 2 is a radial tire for passenger car. The tire 1 comprises a tread portion 2, a pair of sidewall portions 3 connecting to both sides of the tread portion, a pair of bead portions 4 connecting to the sidewall portions, a carcass of one or more plies extending between the bead portions 4, one ply in the illustrated embodiment, and a belt 6 reinforcing the tread portion 2 at an outside of the carcass 5.

The carcass 5 is comprised of a ply of a radial structure containing rubberized organic fiber cords therein. As the organic fiber cord, use may be made of nylon-6 cord, nylon-66 cord, polyester cord, rayon cord and so on. The belt 6 is comprised of two or more rubberized steel cord cross layers, two cross layers in the illustrated embodiment. In the belt 6, a cap layer of rubberized organic fiber cords arranged in a circumferential direction of the tread portion 2 may be arranged on an outside of the steel cord cross layers.

In the method of the invention, RFV of the tire 1 at a state of inflating under a given internal pressure is first measured by a uniformity measuring apparatus to specify a tire position indicating a minimum value A of the measured RFV, preferably a position $P_A$ on a circumference of the tread portion 2. A proper mark is put to the specified position $P_A$ of the tread portion 2. In the measurement of RFV, it is favorable that only a primary component waveform is taken out from the RFV waveform by a Fourier waveform analysis for an output from the uniformity measuring apparatus. In this case, the position PA of the RFV minimum value A can be specified without worrying minimal peak positions as an example of RFV primary component waveform is shown by a solid line in FIG. 5. Moreover, a maximum value B of RFV is existent in a position far apart from the minimum value A.

In order to subsequently correct RFV, at least RFV bottom region $R_A$ of the tire 1, for example, sandwiching the position $P_A$ of the RFV minimum value A from both sides thereof in a circumferential direction of the tread portion 2 (see FIGS. 3 and 5) is heated from room temperature to a given temperature, e.g. a temperature range of 100–180° C. In this case, it is favorable to specify the RFV bottom region $R_A$ at the center of the position $P_A$.

Moreover, it is possible to heat the whole of the tire 1 for the purpose of subjecting the RFV bottom region $R_A$ to the heating.

As the heating method may be selected either the heating outside the RFV correction apparatus as mentioned later or the heating inside the RFV correction apparatus. In the heating outside the RFV correction apparatus, a curing machine may be also used. In any case, it is important that the heating is carried out in the tire 1 not inflated under an internal pressure.

An apparatus used for correcting RFV of the tire 1 after the heating or RFV correction apparatus 100 comprises a split rim of rim segments 101, 102 assembling the tire 1 thereonto as shown in FIGS. 1 and 2. In the apparatus 100, the rim segments 101, 102 are arranged in parallel to each other so as to separate in up and down directions. Either one of these segments, an upper rim segment 101 in the illustrated embodiment is fixed to a main body of the RFV correction apparatus 100, while the other lower rim segment 102 is connected to a moving means 103 between operation position and non-operation position as mentioned later in detail so as to displace in a direction of an axial line y thereof, lift up and down in the illustrated embodiment.

Moreover, the split rim 101, 102 may be arranged so as to divide in right and left directions and axial lines thereof may be extended in a horizontal direction.

And also, the illustrated RFV correction apparatus 100 comprises a pushing means 104 attached to the lower rim segment 102 and having a size smaller than an inner diameter of the tire, and the pushing means 104 is provided with a pushing member 105. The pushing member 105 may be reciprocatively moved in a radial direction of the tire 1 assembled onto the split rim 101, 102 or in a direction x of both end arrows as shown in FIG. 2 and has a function of pushing an inner face 2is of the tread portion 2 from an inside of the tire 1. The pushing member 105 at a pushed state is shown by a phantom line in FIGS. 2 and 3. And also, a length L of the pushing member 105 in the circumferential direction of the tire (see FIG. 3) is a size corresponding to the RFV bottom region $R_A$ of the tire 1.

As shown in FIG. 1, the apparatus 100 further comprises a valve 111 feeding a pressurized gas of a given pressure, e.g. air into an inside of the tire 1 to be assembled onto the split rim 101, 102, and a valve 112 discharging the pressurized air. In FIG. 1, these valves 111, 112 are arranged on the lower rim segment 102. Moreover, either one of these valves may be a valve for feeding and discharging the pressurized air.

When the heating of the tire 1 is carried out outside the apparatus 100, the tire 1 after the completion of the heating is placed on a non-operation position of the apparatus 100 shown by a solid line in FIG. 1, i.e. the lower rim segment 102n existing in a descent position as rapid as possible. In this case, the position $P_A$ of the RFV minimum value A in the tire is corresponded to a central position of the length L of the pushing member 105. Thereafter, the moving means 103 is operated to raise the lower rim segment 102 together with the tire 1 and then the lower rim segment 102 is connected to the upper rim segment 101 through a lock means 113. Thus, the tire 1 is positioned and fixed to a given position. The fixed state of the tire 1 is shown by a phantom line in FIG. 1. In order to ensure the fixation of the tire 1, the pressurized air is filled in the inside of the tire 1 through a feed valve 111.

Then, the inner face 2is of the tread portion 2 at the RFV bottom region $R_A$ of the tire 1 is enlarged by pushing outward in the radial direction through the pushing means 104. More concretely, the pushing means 104 is actuated to move the pushing member 105 outward in the radial direction, whereby the inner face 2is of the tread portion 2 corresponding to the RFV bottom region RA is pushed and enlarged outward in the radial direction through the pushing member 105 at a position by double-dashed lines in FIGS. 2 and 3.

Just after such a push enlargement, the cooling of the tire 1 is started and continued until the shape of the heated portion of the tire 1 is stabilized, for example, until an internal temperature becomes about 60° C., while the pushing through the pushing member 105 is kept for a given time. As the cooling of the tire, a forced cooling is favorable. After the given time from the start of the pushing, the pushing member 105 is turned back, while the moving means 103 is actuated to descend the lower rim segment 102 together with the tire 1. Thus, the operation for RFV correction is completed and the tire 1 is taken out from the lower rim segment 102.

Moreover, the pressurized air filled in the inside of the tire 1 may be discharged after the tire 1 is fixed at the given position, but it is effective to keep the filled state of the pressurized air till the completion of the RFV correcting operation for ensuring the pushing operation of the pushing means 104 and more effectively conducting the RFV correction.

Although the above is a correction process after RFV is measured on individual cured tire 1 at room temperature, the RFV correction can be carried out by the following means when the tire 1 just after being taken out from the curing machine is subjected to PCI (post-cure inflation).

In the latter case, a combination of a given curing machine and a given mold and a mounting position of the mold to the curing machine are previously specified, and a position $P_A$ of RFV minimum value in a given number of cured tires 1 is specified to PCI device under the specified conditions of the above combination and mounting position, and a pushing means 104 is arranged on the PCI device in correspondence to the position $P_A$. In this case, it is possible to enlarge a RFV bottom region $R_A$ of the high-temperature tire 1 just after being automatically taken out from the curing machine by pushing outward in a radial direction through the pushing means 104.

As a result, portions of organic fiber cords in the carcass 5 at the RFV bottom region $R_A$ are stretched by pushing through the pushing means 104, and such a cord stretching state is kept from a high temperature at the start of RFV correction to a low temperature near to room temperature at the completion of RFV correction, so that the cords are surely heat-set at the stretched state and kept at a required stretching degree. And also, the stretched cord portion is never returned even in the subsequent running of the tire 1 under loading.

Figure 4:
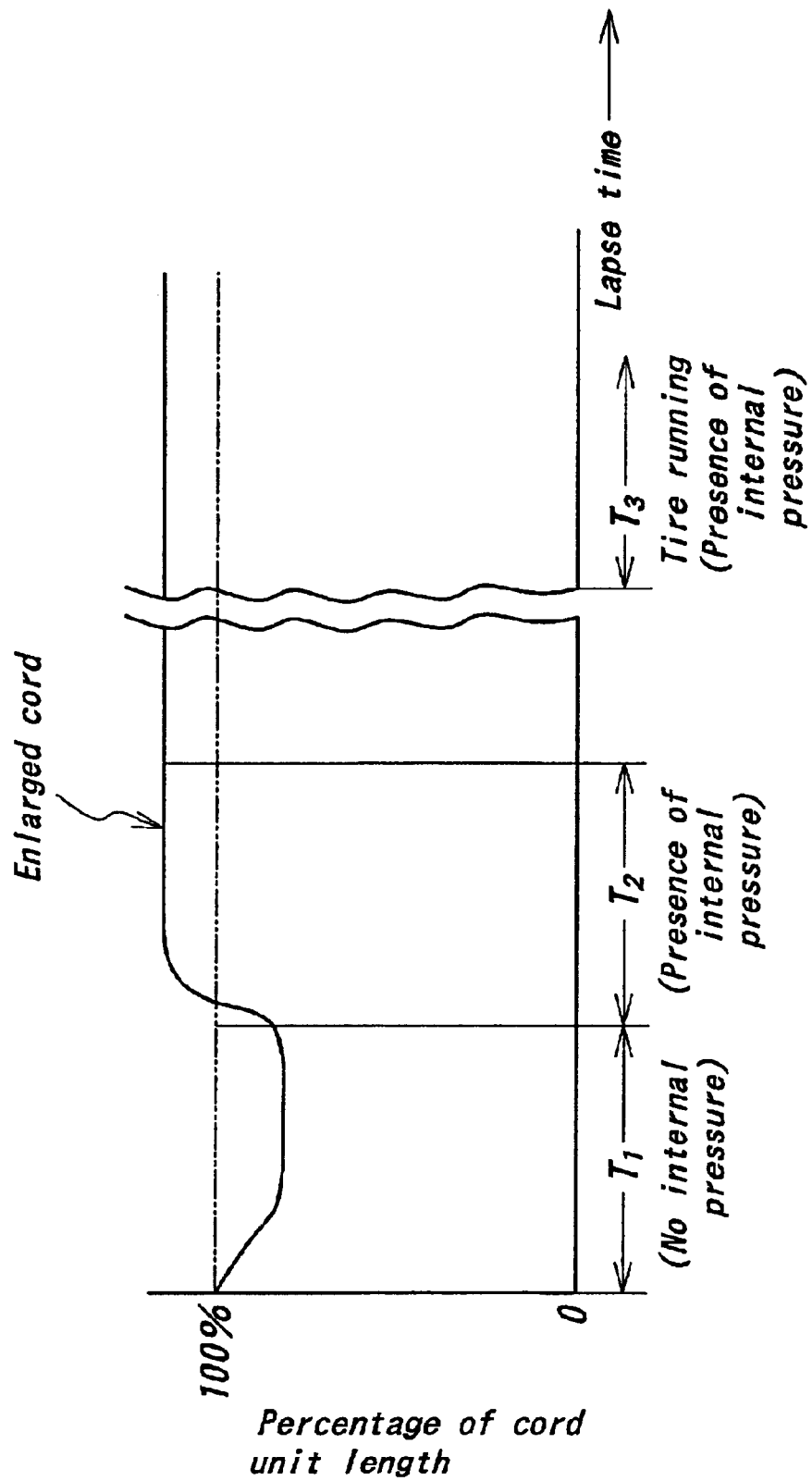
FIG. 4 is a schematic view illustrating a transition of a cord unit length ratio in a tread portion of a tire before and after RFV correction.

This is shown in FIG. 4, wherein an ordinate is a percentage of cord unit length at the RFV bottom region $R_A$ before the correction, for example, when a length of 10 mm is 100%, and an abscissa is a lapse time after the start of heating the tire 1. The lapse time $T_1$, is a heating time of the tire 1, and the lapse time $T_2$ is a pushing time of the RFV bottom region RA, and the lapse time $T_3$ is a time of running the tire under loading. As to the transition of the percentage of the cord length, the cord is heat-shrunk once to less than 100% at the lapse time $T_1$, and the heat-shrunk cord exceeds 100% through the pushing by the pushing means 104 and is 102% in an example as mentioned later, and thereafter the value of 102% is kept even in the running of the tire 1 under loading.

Figure 5:
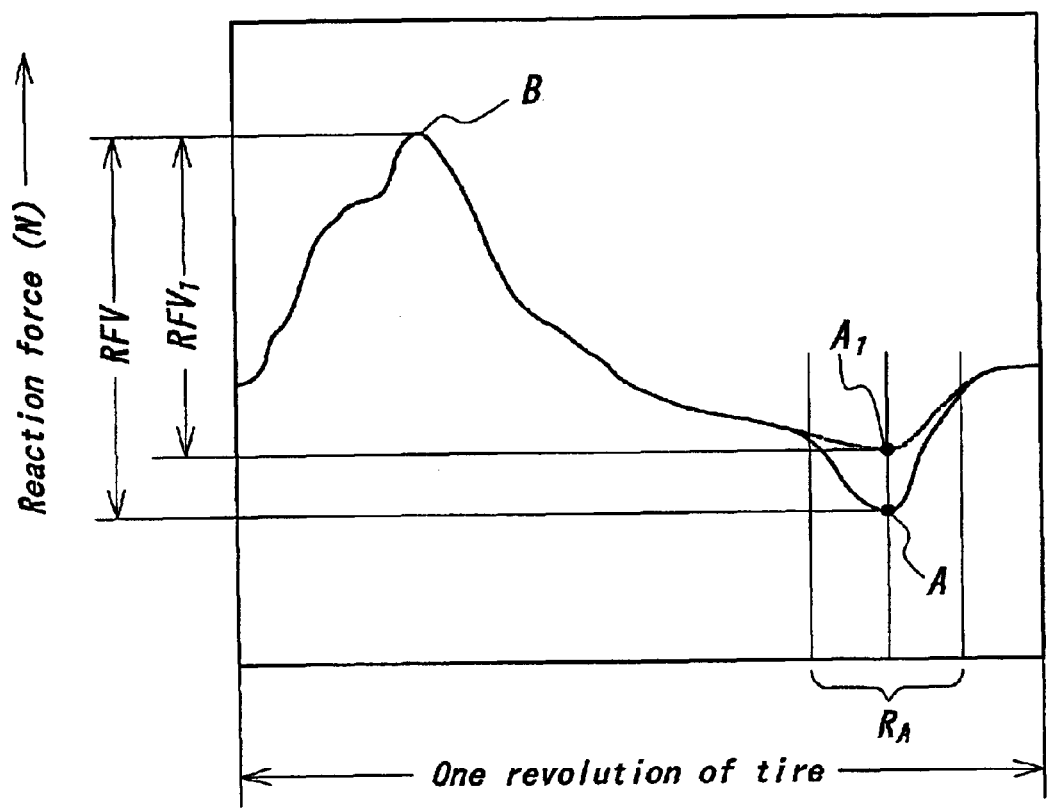
FIG. 5 is a schematic view of RFV waveform in a tire before and after RFV correction according to the invention.

As a result, when RFV is measured in the same tire 1 as used in the measurement of FIG. 5 after the above heating time and pushing time, the minimum RFV value A in FIG. 5 rises to a minimum value $A_1$ and a value of reaction force N at the RFV bottom region RA of the tire 1 is increased to a value shown by a double-dashed line to finally provide $RFV_1 < RFV$ after the RFV correction. It is a min point of the invention that the raise of the reaction force N at the RFV bottom region $R_A$ is carried out by the action of the mechanical force. Therefore, there is no fear that such a raise depends upon the kind of the organic fiber cord used.

The RFV correcting apparatus 100 shown in FIG. 1 comprises means for heating the tire 1 inside the apparatus. That is, a container 115 capable of housing the tire 1 attached to the split rim 101, 102 and opened at its bottom side as a whole is arranged so as to enclose the upper rim segment 101 fixed to the main body of the apparatus 100, and a lid 116 covering the whole opened face of the container 115 is arranged on the lower rim segment 102 provided with the moving means 103. The container 115 is closed with the lid 116 at the completion of the movement of the rim segment 102 for operating the RFV correction.

And also, the container 115 is provided with an inlet port 117 of a heating gas and a duct 118 connected thereto as a feeding means of the heating gas and an inlet port 119 of a cooling gas and a duct 120 connected thereto as a cooling means of the cooling gas and an outlet port 121 and a duct 122 of these gases.

In case of using the container 115, the lower rim segment 102 provided with the tire 1 at room temperature is connected to the upper rim segment 101 to assemble the tire 1 onto the split rim 102, 102 as previously mentioned. At this stage, the container 115 is closed with the lid 116 shown by a phantom line in FIG. 1 and then a heating gas of a given temperature is supplied from the inlet port 117 and duct 118 into the container 115 to heat the whole of the tire 1 under an atmospheric pressure for a given time.

After the tire 1 is heated to a given temperature to complete the heating, a pressurized air is filled in the tire 1 to a given internal pressure through the valve 111 and at the same time the feeding of the heating gas is stopped and the heating gas is discharged through the outlet port 121 and the duct 122 toward the outside of the closed container. In addition, a cooling gas, e.g. air existing outside the apparatus 100 or a cooling gas generated from a gas generating device is supplied to the inside of the closed container through the inlet port 119 and the duct 120 to star and continue the cooling of the tire 1.

Subsequently, the pushing means 104 attached to the lower rim segment 102 is actuated at a state of keeping the internal pressure of the tire 1 to move the pushing member 105 outward in the radial direction, whereby the pushing member 105 is pushed onto the inner face 2is of the tread portion 2 corresponding to the RFV bottom region $R_A$. Thereafter, RFV of the tire 1 is corrected through the same course as mentioned above.

In the RFV correction after the heating of the tire 1 as a whole, a large correcting quantity can be obtained as compared with the case of locally heating the tread portion 2 in correspondence to the RFV bottom region $R_A$ as previously mentioned.

The details of the pushing means 104 and pushing member 105 are described below.

Figure 3:
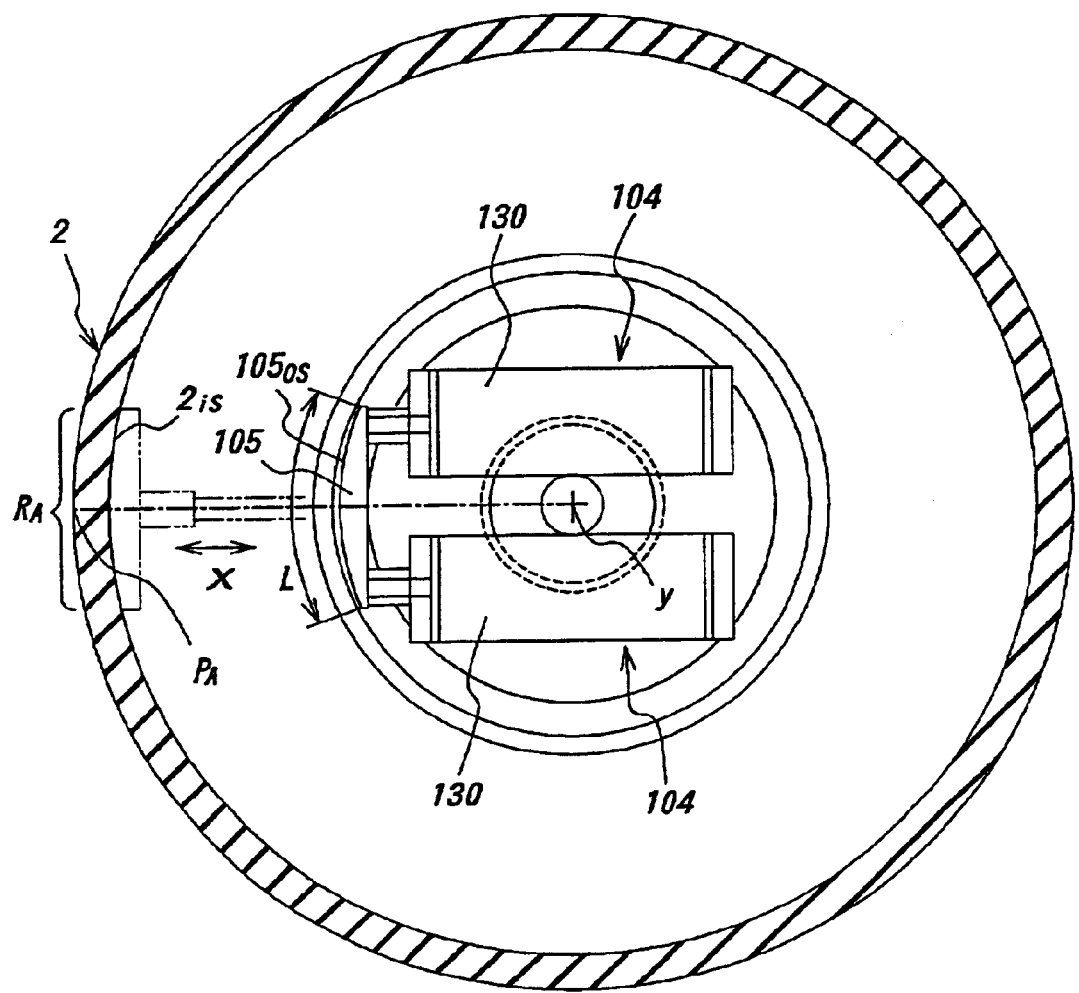
FIG. 3 is a diagrammatically section view taken along a line III—III of FIG. 2.

The pushing means 104 is provided with a reciprocative moving means reciprocating the pushing member 105 outward and inward to the tire 1 attached to the split rim 101, 102 in the radial direction. The reciprocative moving means shown in FIGS. 1–3 is a pair of actuators, more concretely a pair of double-acting cylinders 130 fixed to the lower rim segment 102. The pair of double-acting cylinders 130 are arranged in parallel to each other about an axial line y of the rim.

The pushing member 105 is fixed to a top portion of a piston rod in the double-acting cylinder 130. An outer surface 105os of the pushing member 105 has either one of the same curve or approximate curve as the inner face 2is of the tread portion 2 in the tire 1. In case of the approximate curve, a radius of curvature of the outer surface 105os along a length L of the pushing member 105 in the circumferential direction is made slightly smaller than a radius of curvature of the inner face 2is of the tread portion 2.

As a result, the pushing force of the pushing member 105 having such an outer surface 105os to the inner face 2is of the tread portion 2 is made maximum at the position $P_A$ of the RFV minimum value in the tire 1 and can gradually be decreased from the position $P_A$ toward both sides thereof in the circumferential direction. Thus, the correcting quantity at the position $P_A$ is maximum and the correction at the RFV bottom region $R_A$ may be gentle. Moreover, an innermost back position of the pushing member 105 is a position causing no trouble in the attachment of the tire 1.

Figure 6:
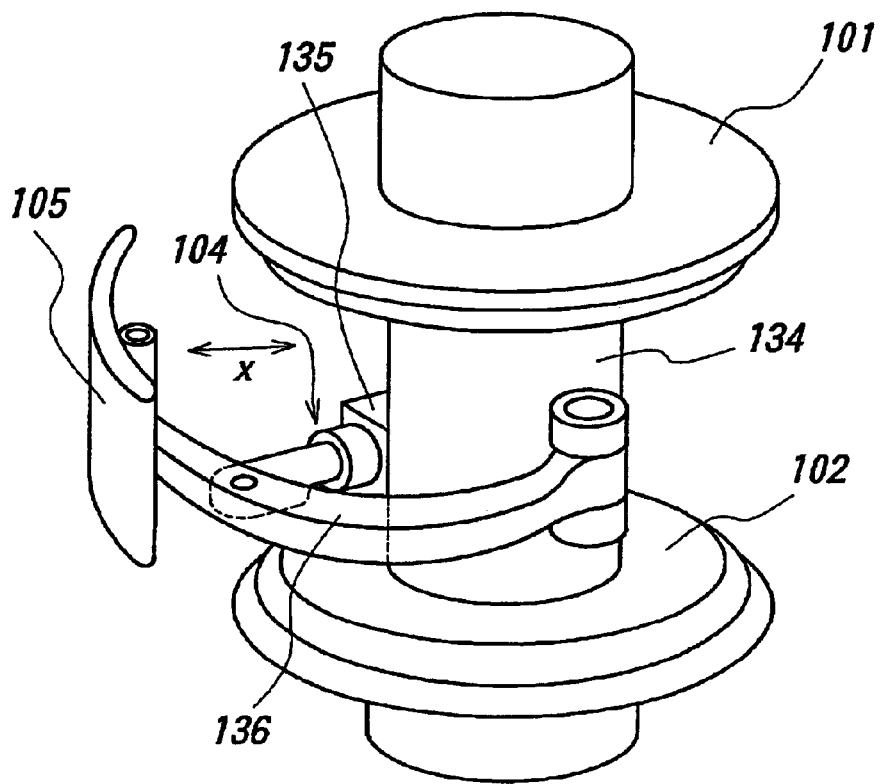
FIG. 6 is a perspective view of a main part of another embodiment of the RFV correction apparatus according to the invention.
Figure 7:
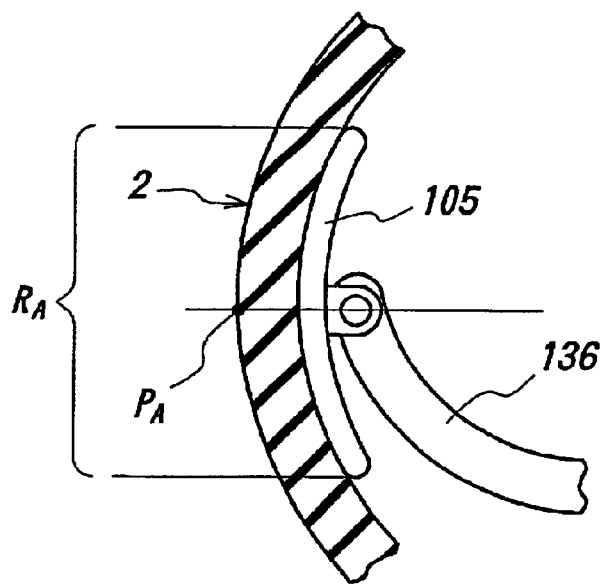
FIG. 7 is a schematic view illustrating a plane view of a pushing member in the correction apparatus shown in FIG. 6 and a partial section view of the tire together.

In FIGS. 6 and 7 is shown another embodiment of the reciprocative moving means for the pushing member 105 arranged on the pushing means 104.

This reciprocative moving means comprises a single actuator, concretely a single double-acting cylinder 135 attached to a projection portion 134 of the lower rim segment 102 provided with the pushing means 104, and a pivoting arm 136 hinged at one end portion to a central portion of the pushing member 105 in the circumferential direction.

The other end portion of the pivoting arm 136 is pivotably connected to the projection portion 134 of the lower rim segment 102 and a top portion of an operating shaft of the double-acting cylinder 136, i.e. a top portion of a piston rod is hinged to a middle portion of the pivoting arm 136, whereby the pushing member 105 is reciprocatively moved in a direction x shown by both end arrows. As a result, the tread portion 2 can be enlarged in the radial direction by pushing the pushing member 105 to the inner face 2is of the tread portion 2. The other construction is the same as in the aforementioned pushing means 104.

Although the RFV correction of the tire is described with respect to the case that the tire is partly or fully heated and the cooling of the tire is carried out from the start of pushing action through the pushing means, the RFV correction may be carried out at room temperature from the start of the correction to the completion thereof without heating and cooling the tire. Even in the latter case, substantially the same action and effect can be attained.

As mentioned above, according to the invention, the inner face of the tread portion at the RFV bottom region of the tire is pushed and enlarged by the mechanical pushing means, so that there can be provided the method of correcting RFV of the tire under a safe operation irrespectively of the kind of the organic fiber cord constituting the carcass ply and without being influenced by the rise of temperature under the occurrence of strain accompanied during the running of the tire under loading as well as RFV correction apparatus suitable for realizing such a method.

What is claimed is:

1. A method of correcting radial force variation of a tire comprising a tread portion and a carcass ply of radial structure containing rubberized organic fiber cords therein, which comprises measuring a radial force variation at room temperature to specify a tire position indicating a minimum value of the radial force variation, pushing and enlarging an inner face of the tread portion outward in a radial direction of the tire by a pushing means at a radial force variation bottom region of the tire which sandwiches the position of the minimum value of the radial force variation in a circumferential direction of the tread portion, and keeping such a push enlarged state for a given time.

2. The method according to claim 1, wherein the radial force variation bottom region is heated from room temperature to a given temperature and thereafter the inner face of the tread portion at the radial force variation bottom region is pushed and enlarged by the pushing means outward in the radial direction and cooling of the tire is started together with such a push enlarging to keep the push enlarged state for a given time under cooling.

3. The method according to claim 1, wherein the measured radial force variation is subjected to a Fourier waveform analysis to take a primary component waveform of radial force variation and the position of minimum value of the radial force variation and the radial force variation bottom region are specified from the primary component waveform.

4. The method according to claim 2, wherein the tire after the measurement of radial force variation is assembled onto a split rim and heated under an atmospheric pressure and a given internal pressure is filled in an inside of the tire after the completion of the heating and a pushing member as the pushing means fixed to either one segment of the split rim is displaced outward in the radial direction of the tire to push the inner face of the tread portion at the radial force variation bottom region.

5. The method according to claim 1, wherein a pushing force of the pushing member as a pushing means is maximum at the position of minimum value of the radial force variation in the tire and is gradually decreased from this position toward both sides thereof in the circumferential direction.

* * * * *